(12) United States Patent
Gonos (10) Patent No.: US 6,901,418 B2
(45) Date of Patent: May 31, 2005

(54) DATA ARCHIVE RECOVERY

(75) Inventor: Dan G. Gonos, Folsom, CA (US)

(73) Assignee: Electronic Data Systems Corporation, Plano, TX (US)

(*) Notice: Subject to any disclaimer, the term of this patent is extended or adjusted under 35 U.S.C. 154(b) by 365 days.

(21) Appl. No.: 10/139,631

(22) Filed: May 7, 2002

(65) Prior Publication Data

US 2003/0212687 A1 Nov. 13, 2003

(51) Int. Cl.$^7$ ............................................. G06F 17/30
(52) U.S. Cl. ..................... 707/204; 707/202; 711/162
(58) Field of Search ............................ 707/200–204, 707/100–102; 711/162, 6; 714/6

(56) References Cited

U.S. PATENT DOCUMENTS

| | | | | |
|---|---|---|---|---|
| 5,666,527 | A | * | 9/1997 | Tatsumi et al. .............. 707/101 |
| 6,016,502 | A | * | 1/2000 | Haneda et al. .............. 715/509 |
| 6,092,079 | A | * | 7/2000 | Gerard et al. ........... 707/103 R |
| 6,151,608 | A | | 11/2000 | Abrams |
| 6,154,748 | A | | 11/2000 | Gupta et al. |
| 6,366,987 | B1 | * | 4/2002 | Tzelnic et al. .............. 711/162 |
| 6,611,923 | B1 | * | 8/2003 | Mutalik et al. ................. 714/4 |
| 6,684,225 | B1 | * | 1/2004 | Huras et al. ................ 707/202 |
| 2002/0059505 | A1 | * | 5/2002 | St. Pierre et al. | |
| 2003/0101145 | A1 | * | 5/2003 | Fang et al. | |

OTHER PUBLICATIONS

Dayen, Igor; "Storing XML in Relational Databases" http://www.xml.com/1pt/a/2001/06/20/databases.html; pp. 1–13; (Jun. 20, 2001).

Cheng, et al; "IBM DB2 XML Extender, An End–to–End Solution for Storing and Retrieving XML Documents", IEEE 2000—ICDE'00 Conference; ftp://ftp.software.ibm.com/software/data/pubs/papers/xmlextbroch.pdf; pp. 1–11; (Feb./2000).

"Informix Migration Guide For Database Servers"; XP–002110344, Informix Press, Menlo Park, CA; pp. 1–115; (Mar./1997).

\* cited by examiner

Primary Examiner—Greta Robinson
Assistant Examiner—Debbie M. Le
(74) Attorney, Agent, or Firm—Allen Scott Lineberry (57) ABSTRACT

The data structure of data removed from a database may be stored with the removed data. The removed data may be restored to the same or different data structure. Identifying information about the removed data may be stored. An attribute tag that identifies the collection of the data within the database may be associated with each removed data element. A removed data element may be restored to the database by comparing the attribute tag of the removed data element with the attribute tags in the current data structure and adding the data element to the database as indicated by the corresponding attribute tag.

21 Claims, 5 Drawing Sheets

```
<EXT>
    <KEYN v="17,14">             ← 230
    <KEYV v="2002-03-18,854"/>   ← 235
    <EXT_DATA>
  210  <T00476 v="CA"/>          ← 220
  211  <T01198 v="2002-03-18"/>  ← 221
  212  <T00836 v="2002-03-18 16:15:19"/>  ← 222
  213  <T00735 v="JOHN"/>        ← 223
  214  <T00736 v="SMITH"/>       ← 224
    </EXT_DATA>
    <KEYN v="17,14">             ← 231
    <KEYV v="2002-03-18,878"/>   ← 236
    <EXT_DATA>
  215  <T00476 v="AZ"/>          ← 225
  216  <T01198 v="2002-03-20"/>  ← 226
  217  <T00836 v="2002-03-20 12:10:23"/>  ← 227
  218  <T00735 v="MARY"/>        ← 228
  219  <T00736 v="JONES"/>       ← 229
    </EXT_DATA>
</EXT>
```

DATA ARCHIVE RECOVERY

TECHNICAL FIELD

This description relates to techniques for restoring archived data to online storage in a computer system.

BACKGROUND

A computer system may store a large amount of data. Some data may need to be available for online access by computer system users, while other data does not need to be available for online access. Data that does not need to be available for online access may be archived to offline media and removed from online storage.

Data stored on offline media may need to be restored for online access. Some data stored offline may not be suitable for restoration into online data structures that exist when the data is to be restored. For instance, if the online data structure changes after the data is archived, the archived data may not be able to be restored. This problem may be solved by storing the data structure in addition to the archived data. A conversion program may be developed and applied at the time of restoration to move the archived data into the changed online data structure. Often the level of effort required to develop a conversion program to restore archived data may be significant. As a result, information in offline storage may become less valuable over time due to the difficulty of restoring the archived data.

SUMMARY

In one general aspect, restoring archived data includes physically moving data from one data collection to another data collection. Data structure information is associated with the moved data, and the moved data is restored to a third data collection based on a comparison of data structure information of the third data collection with data structure information associated with the moved data.

Implementations may include one or more of the following features. For example, the data structure information, such as an attribute tag, may be associated with moved data or a data collection. The moved data may include a series of moved attribute values, each of which may be associated with an attribute tag. A data map may be created that associates an attribute tag of moved data with an attribute tag in a data collection.

One data structure may be associated with the data collection from which the archived data is physically moved, and a different data structure may be associated with the data collection to which the archived data is restored.

A first data structure may have a first group of attributes that includes a first attribute and a second attribute. A second data structure may have a second group of attributes that includes a third attribute and a third group of attributes that includes a fourth attribute. Data having a first attribute value associated with the first attribute and a second attribute value associated with the second attribute may be moved physically from the collection with the first data structure and restored to a third data collection with a second data structure by associating the first attribute value with the third attribute and associating the second attribute value with the fourth attribute.

The data collections may be relational database systems. Alternatively, the data collections may be object-oriented database systems.

The described systems and techniques may be used to restore archived data in large-scale online transaction processing (OLTP) systems or in systems that store data in very large database (VLDB) environments. Large-scale OLTP systems typically generate large amounts of data that need to be available online for a period of time. As data may become less useful with age, data may be archived to offline storage and may sometimes need to be restored into data structures that then exist online. The online, operational data stored in VLDB environments may exceed 2 terabytes, 900 database tables, and 17,000 attributes.

Implementations of the techniques discussed above may include a method or process, or computer software on a computer-accessible medium.

The details of one or more of the implementations are set forth in the accompanying drawings and description below. Other features and advantages will be apparent from the descriptions and drawings, and from the claims.

DESCRIPTION OF THE DRAWINGS

Like reference symbols in the various drawings indicate like elements.

DETAILED DESCRIPTION

Figure 1:
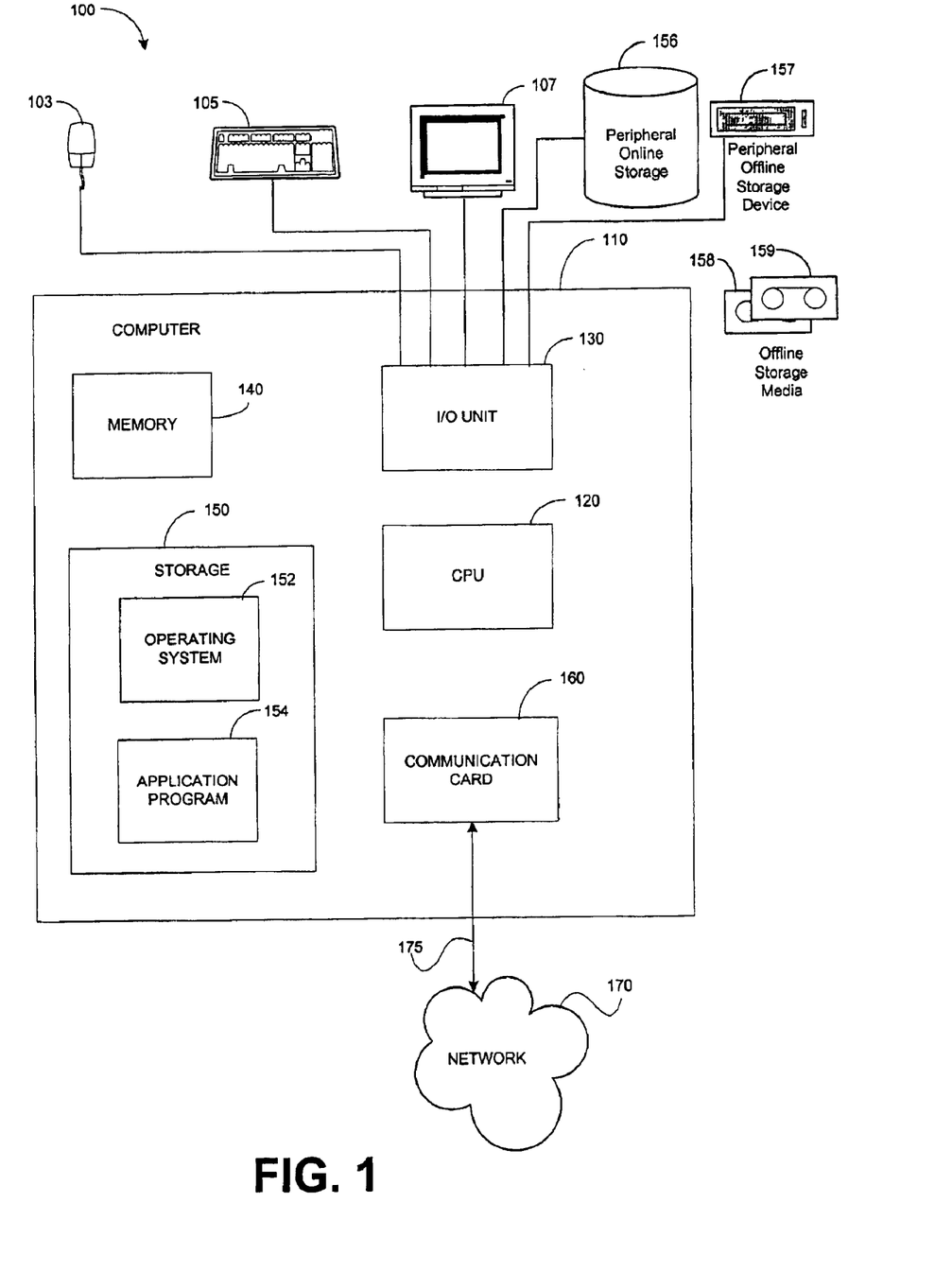
FIG. 1 is a block diagram of a programmable system for restoring archived data to online storage.

Referring to FIG. 1, a programmable system 100 for restoring archived data from offline storage to online storage includes a variety of input/output (I/O) devices (e.g., mouse 103, keyboard 105, and display 107) and a computer 110 having a central processor unit (CPU) 120, an I/O unit 130, a memory 140, and a data storage device 150. Data storage device 150 may store machine-executable instructions, data, and various programs such as an operating system 152 and one or more application programs 154 for restoring archived data, all of which may be processed by CPU 120. Each computer program may be implemented in a high-level procedural or object-oriented programming language, or in assembly or machine language if desired; and in any case, the language may be a compiled or interpreted language. Data storage device 150 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; optical disks; and Compact Disc Read-Only Memory (CD-ROM).

System 100 may include one or more peripheral online storage devices 156 for storing online data and one or more peripheral offline storage devices 157 for storing and accessing offline storage media, such as a tape drive, a tape jukebox, removable or stationary disk drives (magnetic, optical or solid state; alone or organized in arrays), or solid-state devices. Peripheral online storage device 156 may use any storage media (including magnetic, optical or solid state storage media) or any type of storage device (including a drive, a microdrive, a compact disc (CD), CD-recordable (CD-R), CD-rewriteable (CD-RW), flash memory, or solid-state floppy disk cards (SSFDC)).

System 100 also may include removable offline storage media 158 and 159 that are not physically connected to the system 100. Such removable offline storage media 158 and 159 may include any type of storage media (including magnetic, optical or solid state storage media) or any type of storage device (including a drive, a microdrive, a compact disc (CD), CD-recordable (CD-R), CD-rewriteable (CD-RW), flash memory, or solid-state floppy disk cards (SSFDC)).

System 100 also may include a communications card or device 160 (e.g., a modem and/or a network adapter) for exchanging data with a network 170 using a communications link 175 (e.g., a telephone line, a wireless network link, a wired network link, or a cable network). Other examples of system 100 may include a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

Figure 2:
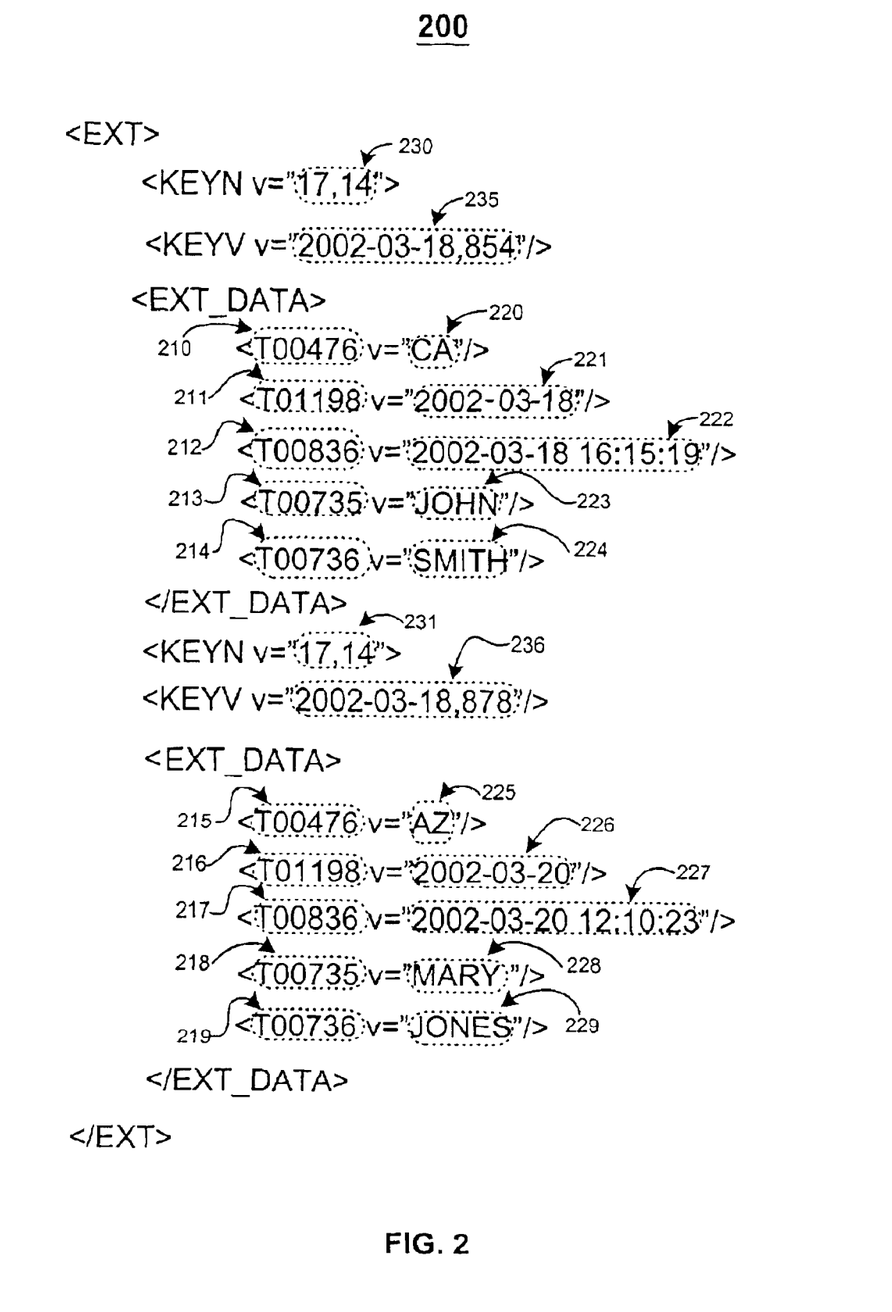
FIG. 2 is a block diagram illustrating a file including archived data and the structure used for the archived data.

Referring to FIG. 2, online data may be stored in a relational database system that logically organizes data into a series of database tables. A database table arranges data associated with an entity in a series of columns and rows. Each column describes an attribute of the entity for which data is being stored. Each row represents a collection of attribute values for a particular entity. When a row may be identified by an attribute, the attribute is often referred to as a key.

Online data may be stored in an object database system that logically organizes data into a series of objects. Each object is associated with a series of attributes, and each instance of an object is associated with a series of attribute values.

Online data may be stored in one or more data files without using a relational database system or an object database system. Each data file stores a series of records. A record is a collection of related data items, and each record may consist of several fields of data.

FIG. 2 shows a file 200 for archived data that includes the archived data and the structure used for the data. An archive file may store archived data, for example, from one or more relational database tables, object instances, or other types of data files. Archive file 200 stores data from a relational database table. For brevity, only a portion of the archive file 200 is illustrated.

Archive file 200 stores a series of attribute tags 210–219 and associated data values 220–229 for archived data. Each attribute tag 210–219 uniquely identifies the database column used to store an associated data value 220–229 in the relational database system. For example, tag 210 has an attribute tag "T00476" that corresponds to a particular column in the online relational database. Data value 220 "CA" is the value that came from the column identified by the attribute tag "T00476".

To restore data value 220 "CA" to the online database structure, data value "CA" would be inserted into the column identified by the attribute tag "T00476" in the online database structure, even if the column is located in a different database table than the database table in which the column was located when the data was archived.

The identification of a particular column associated with a particular attribute tag may be accomplished by using the column name in the database table as the attribute tag for the column, using the identification number (which may be referred to as a "column ID") of the column as the attribute tag for the column, or by identifying each column with a unique attribute tag, storing the association between an attribute tag and column, and storing the column-attribute-tag association in the archive file.

Archived data may be restored based on a particular key value or a range of key values. Archive file 200 stores a key attribute 230 or 231 and an associated key value 235 or 236 that identifies a row associated with the stored attribute values. Here, key value 235 "2002-03-18,854" for the key attribute 230 "17,14" is associated with the attribute tags 210–214 with associated data values 220–224. Key value 236 "2002-03-18,878" for the key attribute 231 "17,14" is associated with the attribute tags 215–219 with associated data values 225–229.

Archive file 200 may be developed using XML ("Extensible Mark-up Language"). XML is a language similar to hypertext markup language (HTML) but with the additional flexibility of being able to describe data structures that can be processed directly as data by a program. Archive file 200 may use a text file format, such as a file using an ASCII (American Standard Code for Information Interchange) code or Unicode to represent each stored character. Some implementations may store archived data in a different file format, such as a binary file or a database table.

By storing the structure of the data (here, a unique attribute tag) within the archive file that stores the data, the archived data may be restored to the same or a different online data structure.

Some implementations may store the structure of the data in one archive file and the data in a separate archive file. For instance, the structure of the data may be stored in an archive file developed using XML, and the data stored in a second archive file, such as a comma-delimited text file.

Figure 3:
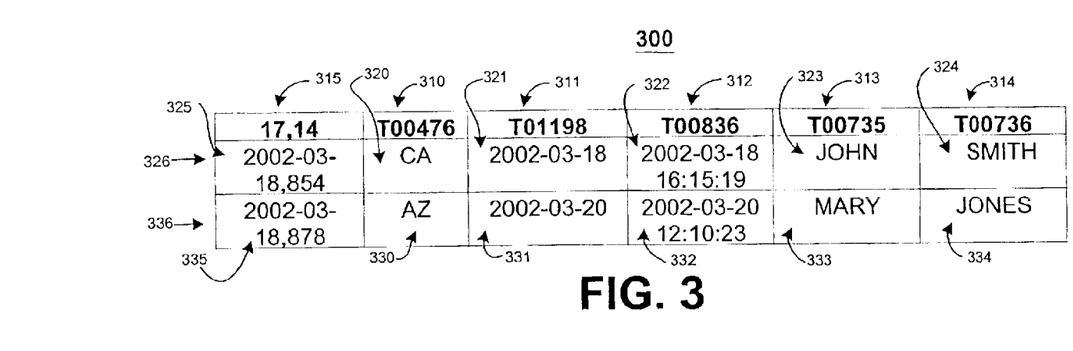
FIGS. 3 and 4 are block diagrams illustrating database tables storing archived data that has been restored.

FIG. 3 illustrates a database table 300 that stores archived data that has been restored from archive file 200. Database table 300 has columns 310–314 that are identified by attribute tags 210–214 and 215–219 in archive file 200. For example, attribute tags 210 and 215 identify column 310, all of which are identified by the label "T00476", attribute tags 211 and 216 identify column 311, all of which are identified by the label "T01198", and so on. Database table 300 has column 315 that is identified by key number "17,14" and stores a key value for each row.

Data values 220–224 and associated key value 235 in archive file 200 have been inserted as data values 320–324 and key value 325 in row 326 of database table 300. Similarly, data values 225–229 and associated key value 236 in archive file 200 have been inserted as data values 330–334 and key value 335 in row 336 of in database table 300.

Archived data from archive file 200 may be restored to database table 300 because the data structure (here, a unique attribute tag) is stored within the archive file.

Figure 4:
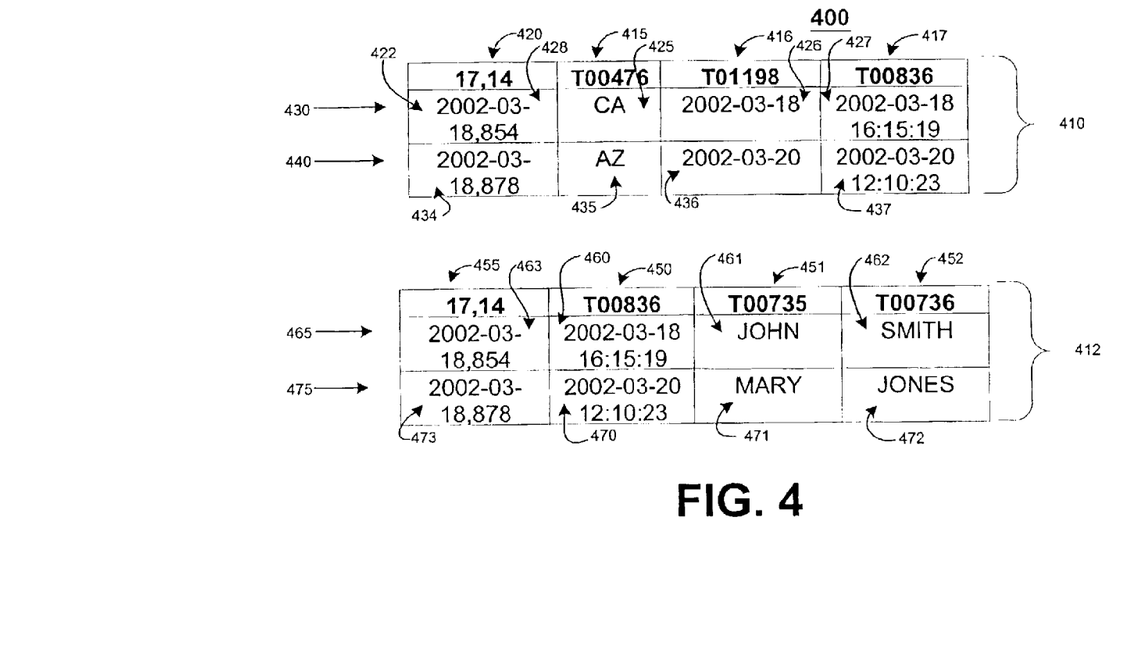

FIG. 4 illustrates two database tables 410 and 412 that store archived data that has been restored from archive file 200. Database table 410 has columns 415–417 that are identified by attribute tags 210–212 and 215–217 in archive file 200. Database table 410 has column 420 that is identified by key number "17,14" and stores a key value for each row.

Data values 220–222 and associated key value 235 in archive file 200 have been inserted as data values 425–427 and key value 428 in row 430 of database table 410. Similarly, data values 225–227 and associated key value 236 in archive file 200 have been inserted as data values 435–437 and key value 434 in row 440 in database table 410.

Database table 412 has columns 450–452 that are identified by attribute tags 212–214 and 217–219 in archive file

200. Database table 412 has column 455 that is identified by key number "17,14" and stores a key value for each row.

Data values 222–224 and associated key value 235 in archive file 200 have been inserted as data values 460–462 and key value 463 in row 465 of database table 412. Similarly, data values 227–229 and associated key value 236 in archive file 200 have been inserted as data values 470–472 and key value 473 in row 475 in database table 412.

Data values 222 and 227 appear in database table 410 and database table 412 because each database table has a column 417 and 450, respectively, that is identified by attribute tag "T00836" that is associated with the data values 222 and 227.

By storing the structure of the data with the archive data in the archive file, the archived data may be restored to a different online data structure than existed at the time when the data was archived.

Figure 5:
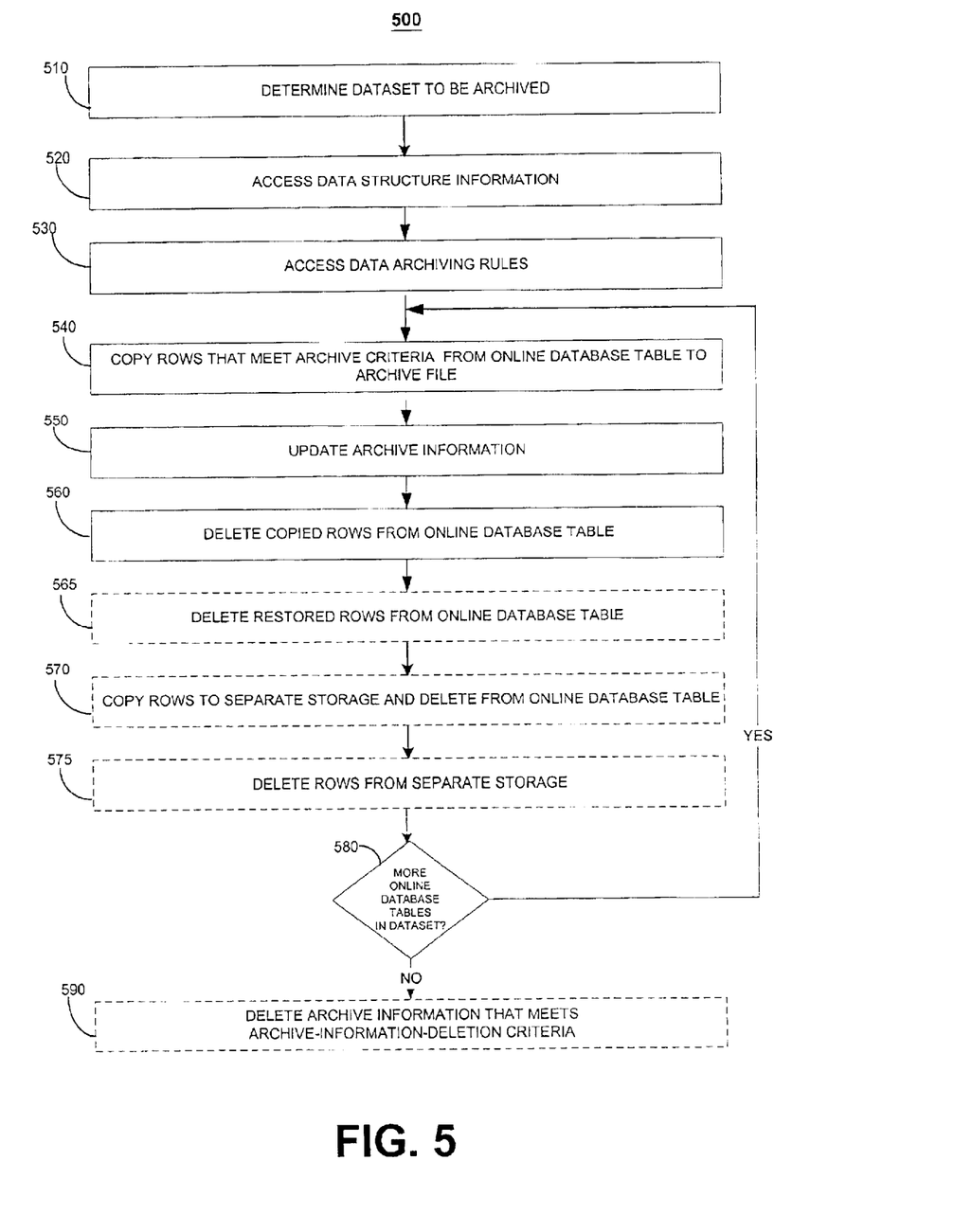
FIG. 5 is a flow chart of a procedure for archiving data.
Figure 6:
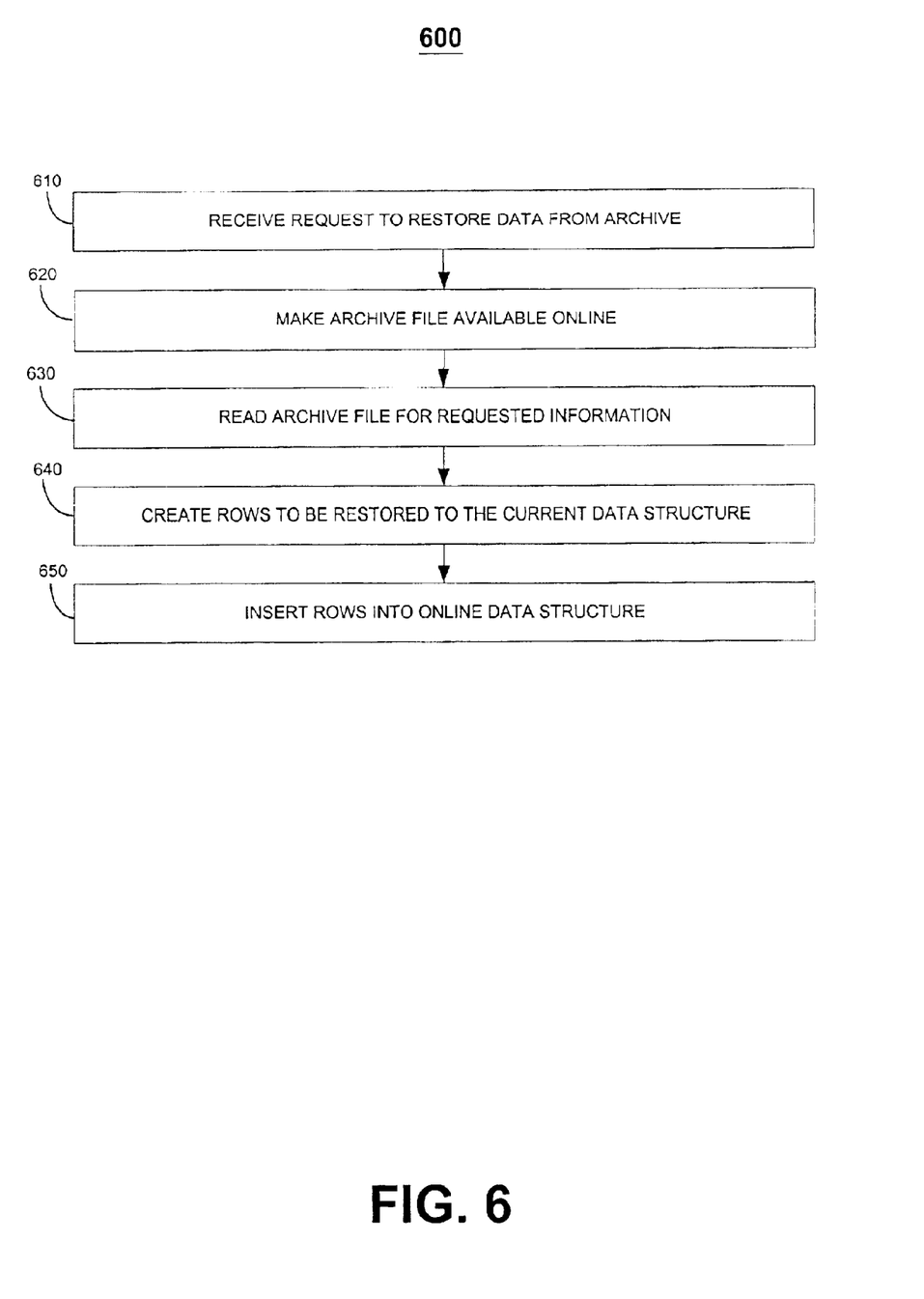
FIG. 6 is a flow chart of a procedure for restoring archived data to online storage.

Referring to FIGS. 5 and 6, for illustrative purposes, a particular implementation of a data archive restoration system is described. In the described implementation, a relational database management system, such as an Oracle 8 Database or an Oracle 9i Database available from Oracle Corporation or Informix data management software from IBM®, is used for online data storage. The relational database stores data in database tables with each record stored as a row, and each attribute stored as a column in the database table. Each column is identified uniquely in the database system with an attribute tag. A dataset is a group of related database tables, and several datasets are included in the database. For instance, a client dataset may be a group of five database tables storing client information in a database that contains five hundred database tables. Each database table in the client dataset may contain a client identifier as a key that uniquely identifies information for a particular client in the database tables included in the client dataset.

Referring to FIG. 5, a process 500 controls a processor to archive data and the structure used for the archived data. The process 500 is initiated when a determination is made that a particular dataset is going to be archived (step 510). This determination may be made based on the passage of a predetermined period of time since the last time the dataset or database was archived or on a predetermined schedule for one or more datasets included in the database or the entire database.

The processor accesses data structure information about the dataset being archived (step 520). The data structure information may be accessed from a data dictionary, directly from the database structure, or from a configuration file that describes the data structure of the database.

The processor then accesses data archiving rules for the database tables included in a particular dataset being archived (step 530). The data archiving rules describe the decision logic that controls when a row may be removed from a particular online database table. There may be a different data archiving rule for each database table. A row may be removed from an online database table to the archive file based on length of time since the date on which the row was created. For example, a row in a particular database table may be removed from that particular online database table to the archive file when at least 120 days have passed since the row was created. A row in a different database table may be removed from that particular online database table when at least 180 days have passed since the row was created.

Some implementations may remove a row based on the date on which the row was last modified or a combination of the creation date (or the date of the last modification) of the row and another factor, such as the size of a database table, a dataset, or a database, or the rate of growth of a database table, a dataset or a database.

Some implementations may not remove a row from some database tables. For example, rows in a reference table that associates state names and postal abbreviations may not be removed from online storage. There may be an explicit rule that indicates that no rows are removed by the archiving process from a particular database table, or such a rule may be implied by the absence of an archiving rule for a particular table.

Some implementations may include a default archiving rule to be used for all database tables unless a specific archiving rule is defined for a database table. For instance, the default archiving rule may be that a row in each database table in a particular dataset may be archived no sooner than 120 days after the row was created. An archiving rule for a particular database table in that dataset may be defined as removing a row in the particular database table when at least 45 days have passed since the row was created. A row in the particular database table will be archived 45 days after the date that the row was created rather than following the default rule for the dataset of 120 days.

The processor then archives rows in the database by processing one database table after another until all database tables in the dataset have been processed (steps 540–580). The processor copies to the archive file the rows that meet the archiving criteria for the particular database table being processed (step 540). For each row copied, the processor includes the attribute tag for the row key, a row key value, and a series of attribute tags and data values for each column in the database table, as described above with respect to FIG. 2.

When the processor has completed writing any rows to the archive file from all the database tables in the dataset according to the archiving rules, the processor updates the archive information for the dataset (step 550). The archive information may help identify the data that is stored in a particular archive file. The archive information for each dataset includes an archive index, an archive index identification, and an online archive database table.

The archive index file and the archive index identification file describe the data stored in the archive file for the dataset. An archive index file and an archive index identification file are associated with each archive file. The archive index file describes the type of data (such as client data, invoice data, or quality assurance data) included in the archive file. The archive index identification file includes a list of the key values associated with each row stored in the archive file.

The online archive database table identifies the archive file, the archive index file, and the archive identification file created and the key values of the rows archived during the archiving process 500.

Other implementations may store different archive information or may organize archive information in a different manner. For example, some implementations may store information about more than one archive file in an archive index file or may include the type of data and key values in a single archive index file. Some implementations may only use a database table or only use a text file to store archive information.

The processor then deletes the rows from the online database table being processed that have been copied to the archive file (step 560).

Some implementations may process a restored row in the same manner as a unrestored row in a database table. Unless the archiving criteria used for the database table that includes the restored row has changed since the time when the restored row was originally archived, the restored row is re-archived when the archive process for the dataset is next performed, and the restored row is duplicated in more than one archive file.

The processor in some implementations may delete rows that have been restored from an archive file to an online database table rather than re-archiving the restored rows (step 565). The decision logic to delete a restored row may be based on a period of time from which the row was restored (e.g., delete all restored rows not less than 30 days after the date on which the row was restored) and may apply to a particular database table in the dataset, all database tables in the dataset, all database tables, or a default rule for a dataset that may be modified by a particular rule for the database table.

Some implementations may move some rows to separate storage in lieu of archiving the row. For example, incorrect data values in a database table may be corrected by inserting a row that has the accurate data values and identifying the previous row as "corrected." The "corrected" row is no longer valid and may be moved from the online database table to separate storage (such as a separate database table that has a higher access latency than the corresponding online database table), stored for a period of time, and subsequently deleted from separate storage. Storing the "corrected" row in separate storage for a period of time instead of archiving the correction may provide an audit trail for the correction, reduce the amount of online data stored, and reduce the amount of data that is archived.

The processor copies rows in the online database table being processed that meet a criteria for being moved to separate storage and deletes those rows from the online database table (step 570). For example, the decision logic may be that any row that has not been accessed or any row that was accessed over 30 days before the date on which the archive process is performed is moved to separate storage. The decision logic may apply to all database tables in the dataset, may apply to a particular database table in the dataset, or may be a default rule for a dataset that is modified by a particular rule for the database table. The processor then deletes rows from separate storage that meet the decision logic for so doing (step 575). For example, the decision logic may be that a row is deleted from separate storage after a predetermined number of days since the row was moved to separate storage or after the archiving process has been performed for the dataset a predetermined number of times since the row was moved to separate storage. The decision logic may apply to a particular database table in the dataset, to all database tables in the dataset, may be a default rule for a dataset that is modified by a particular rule for the database table, or may apply to all database tables.

The processor determines whether any additional online database tables in the dataset need to be processed (step 580). If so, the processor copies rows to the archive file that meet the archive criterion for the online database table (step 540) and proceeds as previously described.

When processing of each database table in the dataset is complete (step 580), the processor may delete unnecessary archive information (step 590). For example, the processor may delete the archive file, the archive index file, and the archive index identification file after a predetermined period of time has passed since those files were created or a predetermined period of time has passed since those file were used.

Referring to FIG. 6, a process 600 controls a processor to restore data from an archive file to an online database using the structure of the archived data stored in the archive file. The process 600 is initiated when a request to restore data from an archive file is received (step 610). The request identifies a particular key value in a particular archive file for which the archive data for the key value stored in the archive file is to be restored to the online database. The process 600 restores all of the data values associated with the identified key value in the archive file. As described previously with respect to FIG. 5, the archive file stores data for a series of database tables in a dataset. The process 600 restores data values from the archived database tables for a particular key value.

Some implementations may restore data for a particular key value from a particular database table that was archived or may restore all the archive data in a particular archive file. Information contained in the online archive database, the archive index file, or the archive index identification file may be used to formulate a request to restore archived data.

The restoration process 600 requires that the particular archive file be available (step 620). The processor may control a storage device, such as a tape or CD jukebox, to make the media on which the archive file is stored available or a system operator may make the archive file available, for example, by placing an appropriate CD or tape in an appropriate I/O device so that the processor may access the archive file.

The processor reads the archive file identified by the restoration request to locate the identified key value within the archive file (step 630). The processor compares the attribute tags stored in the archive file with the attribute tags associated with columns in the current online database to determine where to insert each archived data value. When an attribute tag in the archive file is the same as an attribute tag in the online database, the processor inserts the archived data value associated with the attribute tag for the key value to be restored in an online database column corresponding to the matching attribute tag regardless of the database table in which the column is located. Some implementations may create the data map using Rational ROSE, an object modeling tool available from Rational Corporation, or XML Spy, an XML-development tool available from Altova Corporation. The processor then creates a record to be restored to the current online database structure (step 440). The processor may create a data map that associates each attribute tag in the archive file with a corresponding attribute tag and the database table in which the column associated with the attribute tag is located in the online database.

The processor creates rows to be inserted according to the current online database structure. The processor performs any necessary data conversion to match the current online database structure. For instance, the processor may convert an integer value from the archive file to a corresponding real number value that is inserted into the current online database table that stores the attribute associated with the attribute tag that matches the stored attribute tag number. The processor may increase the size of an attribute value to be restored by adding neutral characters, such as spaces or leading zeroes, to match the size of the column if the column requires fixed-length data.

The processor then proceeds to insert the created rows into the online data structure (step 650). The processor continues to insert created rows into each online database table until all the rows have been inserted.

The benefits from storing data structure information with data removed from a database using the techniques described are not limited to storing archived data offline. For example, the archived data may be stored in secondary storage that is available online.

Implementations may include a method or process, an apparatus or system, or computer software on a computer medium. It will be understood that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

Other implementations are within the scope of the following claims.

What is claimed is:

1. A computer-implemented method for restoring data, the method comprising:
   physically moving data from a first data collection to a second data collection, the moved data comprising a series of moved attribute values each of which is associated with an attribute tag in the first data collection;
   associating data structure information that includes an attribute tag associated with each moved attribute value with the moved data, wherein each attribute tag in the data structure information identifies an attribute tag in the first data collection that is associated with a moved attribute value; and
   restoring the moved data to a third data collection from the second data collection, the moved data being restored based on a comparison of data structure information of the third data collection with data structure information associated with the moved data.

2. The method of claim 1 wherein
   the data structure information of the third data collection comprises a collection attribute tag.

3. The method of claim 2 further comprising creating a data map that associates an attribute tag with a collection attribute tag.

4. The method of claim 1 further comprising:
   associating a first data structure with the first data collection, and
   associating a second data structure with the third data collection,
   wherein the first data structure is not the same as the second data structure.

5. The method of claim 4 wherein:
   the first data structure comprises a first group of attributes associated with a first attribute and a second attribute,
   the second data structure comprises a second group of attributes associated with a third attribute and a third group of attributes associated with a fourth attribute,
   physically moving data from a first data collection to a second data collection comprises physically moving a first attribute value associated with the first attribute and a second attribute value associated with the second attribute, and
   restoring the moved data to a third data collection from the second data collection comprises associating the first attribute value with the third attribute and associating the second attribute value with the fourth attribute.

6. The method of claim 1 wherein the first data collection and the third data collection are relational database systems.

7. The method of claim 1 wherein the first data collection and the third data collection are object-oriented database systems.

8. A computer-readable medium or propagated signal having embodied thereon a computer program configured to restore data, the medium comprising a code segment configured to:
   physically move data from a first data collection to a second data collection, the moved data comprising a series of moved attribute values each of which is associated with an attribute tag in the first data collection;
   associating data structure information that includes an attribute tag associated with each moved attribute value with the moved data, wherein each attribute tag in the data structure information identifies an attribute tag in the first data collection that is associated with a moved attribute value; and
   restore the moved data to a third data collection from the second data collection, the moved data being restored based on a comparison of data structure information of the third data collection with data structure information associated with the moved data.

9. The medium of claim 8, wherein
   the data structure information of the third data collection comprises a collection attribute tags.

10. The medium of claim 9 further comprising a code segment configured to create a data map that associates an attribute tag with a collection attribute tag.

11. The medium of claim 8 further comprising a code segment configured to:
    associate a first data structure with the first data collection, and
    associate a second data structure with the third data collection,
    wherein the first data structure is not the same as the second data structure.

12. The medium of claim 11 wherein:
    the first data structure comprises a first group of attributes associated with a first attribute and a second attribute,
    the second data structure comprises a second group of attributes associated with a third attribute and a third group of attributes associated with a fourth attribute,
    physically moving data from a first data collection to a second data collection comprises physically moving a first attribute value associated with the first attribute and a second attribute value associated with the second attribute, and
    restoring the moved data to a third data collection from the second data collection comprises associating the first attribute value with the third attribute and associating the second attribute value with the fourth attribute.

13. The medium of claim 8 wherein the first data collection and the third data collection are relational database systems.

14. The medium of claim 8 wherein the first data collection and the third data collection are object-oriented database systems.

15. A system for restoring data, the system comprising a processor connected to a storage device and one or more input/output devices, wherein the processor is configured to:
    physically move data from a first data collection to a second data collection, the moved data comprising a series of moved attribute values each of which is associated with an attribute tag in the first data collection;
    associating data structure information that includes an attribute tag associated with each moved attribute value with the moved data, wherein each attribute tag in the data structure information identifies an attribute tag in the first data collection that is associated with a moved attribute value; and restore the moved data to a third data collection from the second data collection, the moved data being restored based on a comparison of data structure information of the third data collection with data structure information associated with the moved data.

16. The system of claim 15 wherein the data structure information of the third data collection comprises a collection attribute tag.

17. The system of claim 16 wherein the processor is further configured to create a data map that associates an attribute tag with a collection attribute tag.

18. The system of claim 15 wherein the processor is further configured to:

associate a first data structure with the first data collection, and associate a second data structure with the third data collection, wherein the first data structure is not the same as the second data structure.

19. The system of claim 18 wherein:

the first data structure comprises a first group of attributes associated with a first attribute and a second attribute, the second data structure comprises a second group of attributes associated with a third attribute and a third group of attributes associated with a fourth attribute, physically moving data from a first data collection to a second data collection comprises physically moving a first attribute value associated with the first attribute and a second attribute value associated with the second attribute, and restoring the moved data to a third data collection from the second data collection comprises associating the first attribute value with the third attribute and associating the second attribute value with the fourth attribute.

20. The system of claim 15 wherein the first data collection and the third data collection are relational database systems.

21. The system of claim 15 wherein the first data collection and the third data collection are object-oriented database systems.

* * * * *